United States Patent
Parizat et al.

(10) Patent No.: US 6,889,614 B2
(45) Date of Patent: May 10, 2005

(54) AIR BAG INFLATOR

(75) Inventors: Ammon Parizat, Old Westbury, NY (US); Marek Tarczynski, New York, NY (US)

(73) Assignee: Island Pyrochemical Industries Corp., Mineola, NY (US)

( * ) Notice: Subject to any disclaimer, the term of this patent is extended or adjusted under 35 U.S.C. 154(b) by 300 days.

(21) Appl. No.: 10/243,926

(22) Filed: Sep. 13, 2002

(65) Prior Publication Data

US 2004/0051284 A1 Mar. 18, 2004

(51) Int. Cl.$^7$ .............................................. B60R 21/26
(52) U.S. Cl. ...................... 102/530; 102/200; 102/202; 102/531; 280/736; 280/741; 280/742
(58) Field of Search ................ 102/200, 205, 102/530, 531, 702, 293, 202; 280/736, 741, 737, 740, 742, 728.1

(56) References Cited

U.S. PATENT DOCUMENTS

| | | | |
|---|---|---|---|
| 3,690,255 A | * 9/1972 | Vass et al. ................... 102/531 |
| 3,889,703 A | * 6/1975 | Keathley ..................... 137/67 |
| 3,985,375 A | * 10/1976 | Lewis et al. ................. 280/737 |
| 4,109,578 A | * 8/1978 | Goetz ......................... 102/531 |
| 5,060,973 A | * 10/1991 | Giovanetti ................... 280/736 |
| 5,487,561 A | * 1/1996 | Mandzy et al. .............. 280/741 |
| 5,639,117 A | * 6/1997 | Mandzy et al. .............. 280/741 |
| 5,669,631 A | 9/1997 | Johnson et al. .............. 280/741 |
| 5,746,445 A | 5/1998 | Johnson et al. .............. 280/741 |
| 5,768,885 A | * 6/1998 | Johnson et al. ............... 60/204 |
| 5,775,091 A | * 7/1998 | Bannister et al. ............. 60/775 |
| 5,806,884 A | * 9/1998 | Johnson et al. ............. 280/736 |
| 5,806,885 A | 9/1998 | Hock ......................... 280/737 |
| 5,829,784 A | * 11/1998 | Brown et al. ................ 280/737 |
| 5,845,933 A | * 12/1998 | Walker et al. ................ 280/741 |
| 5,851,030 A | 12/1998 | Johnson et al. .............. 280/741 |
| 6,036,226 A | 3/2000 | Brown et al. ................ 280/736 |
| 6,039,347 A | 3/2000 | Maynard ..................... 280/736 |
| 6,481,357 B1 | * 11/2002 | Lindner et al. .............. 102/530 |
| 6,746,044 B2 | * 6/2004 | Elqadah et al. .............. 280/736 |
| 2004/0000777 A1 | * 1/2004 | Meduvsky et al. ........... 280/742 |

FOREIGN PATENT DOCUMENTS

| | | |
|---|---|---|
| FR | 2757119 | 6/1998 |
| WO | WO 98/33684 | * 8/1998 |

* cited by examiner

*Primary Examiner*—Michael J. Carone
*Assistant Examiner*—James S. Bergin
(74) *Attorney, Agent, or Firm*—Francis C. Hand; Carella, Byrne, Bain

(57) ABSTRACT

The air bag inflator employs an injection piston assembly in which liquid propellant is delivered through nozzles in the injection piston to the combustion chamber. Metering of the liquid propellant is accomplished in a manner that is not sensitive to changes in ambient temperatures. A plug is slidably mounted between the propellant chamber and the nozzles to prevent flashback at startup. The plug is pushed forwardly to expose the nozzles to the propellant chamber in response to a predetermined pressure in the propellant chamber. A plug may also be fitted into each nozzle to be expelled into the combustion chamber upon opening of the nozzle. A tape may also be provided over the outlet of the nozzle to prevent flashback into the propellant chamber.

27 Claims, 2 Drawing Sheets

AIR BAG INFLATOR

This invention relates to an air bag inflator. More particularly, this invention relates to a liquid propellant air bag inflator.

As is known, various types of air bag inflators have been used for inflating air bags in vehicles such as automobiles in order to protect an occupant against injury. Typically, the inflators have been constructed to introduce an inflation gas into the air bag within a very short time period.

U.S. Pat. No. 6,036,226 describes an air bag inflator in which a liquid propellant is introduced into a combustion chamber at a controlled rate via a central opening in a piston in order to inflate an air bag. U.S. Pat. No. 5,669,631 describes an air bag inflator of a liquid propellant type in which a liquid propellant is introduced into a combustion chamber at a controlled rate in order to inflate one or more air bags. As described, the liquid propellant is passed from a reservoir into the combustion chamber by passing around an annular head of the piston through grooves in the wall of the cylinder housing the piston. U.S. Pat. No. 5,060,973 describes a further technique for inflating an air bag In many cases, the air bag inflators have been constructed in a manner such that the combustion process is sensitive to changes of ambient temperature.

It is an object of the invention to reduce the sensitivity of the combustion process of an air bag inflator to changes of ambient temperature.

It is another object of the invention to protect a liquid propellant in a reservoir of an air bag inflator against flash back during start up.

It is another object of the invention to control the mass flow rate of a gas entering an air bag.

It is another object of the invention to prevent contact of a liquid propellant with metal parts during storage in an air bag inflator.

It is another object of the invention to provide an improved liquid propellant for an air bag inflator.

Briefly, the invention provides an injection piston assembly for an air bag inflator comprising an injection piston having a propellant chamber therein for a charge of liquid propellant, at least one nozzle in one end of the piston communicating the propellant chamber with a combustion chamber external to the piston to deliver liquid propellant from the propellant chamber thereto, and means for releasably closing the nozzle to prevent communication between the propellant chamber and the combustion chamber.

Injecting the liquid propellant through one or more nozzles in the piston itself allows for a more controlled injection of the liquid propellant into the combustion chamber and is not affected by changes in ambient temperature.

The injection piston assembly also includes a pump piston that is mounted in the propellant chamber of the injection piston to define the propellant chamber and through which a liquid propellant may be delivered when filling the injection piston assembly. In use, as the two pistons of the injection piston assembly move relative to each other, the liquid propellant in the propellant chamber is pressurized. Once a predetermined level of pressure is reached, the liquid propellant is forced out of the propellant chamber through the nozzles thereby deactivating the means that releasably close the nozzles.

The combustion chamber is also provided with a stop that allows for an expansion of the liquid propellant in the propellant chamber without the pump piston disengaging. This arrangement allows expansion of the liquid propellant and the generation of gas inside the injection piston without an excessive increase of pressure within the injection piston.

The injection piston assembly may be used in any suitable inflator construction. For example, the piston assembly may be mounted in an air bag inflator constructed with a housing having a combustion chamber and a plurality of ports for expelling combustion gas from the combustion chamber. Such an inflator typically has an initiator mounted on the housing for introducing a combustion gas into the combustion chamber. The injection piston is slidably mounted in the combustion chamber for movement between an initial position and an expelled position in response to the introduction of a combustion gas into the combustion chamber from the initiator.

The inflator also has a plug mounted in the housing coaxially of the piston to slidably receive the injection piston during a combustion process and to otherwise close the housing.

The means for releasably closing the nozzle includes a tape that is secured to the injection piston over the nozzle on a side facing the combustion chamber in order to prevent a flow of combustion gas from a combustion chamber through the nozzle during startup. This means may also include a plug fitted into the nozzle. This plug is expellable from the nozzle into the combustion chamber in response to a pressurized flow of liquid propellant from the propellant chamber through the nozzle and acts as a check valve during startup.

The injection piston, where made of metal, is provided with a protective coating within the propellant chamber in order to prevent contact between a liquid propellant in the propellant chamber and the metal of the piston.

The inflator is operatively connected in a conventional manner to a central processing unit to receive an initiating signal to activate the initiator. The central processing unit, in turn, is connected to one or more sensors in a vehicle in order to receive and process signals therefrom for activating the inflator in dependence on the signals received.

In operation, upon activation of the initiator, a flow of combustion gas is introduced into the combustion chamber from the initiator. As this gas expands, pressure is built up in the combustion chamber sufficient to move the injection piston from its initial position to an expelled position thereby compressing the liquid propellant within the propellant chamber. When the pressure of the liquid propellant reaches a certain level, the plug that is fitted into the nozzle is blown out of the nozzle into the combustion chamber while piercing the tape disposed over the nozzle. The liquid propellant is then metered through the nozzle into the combustion chamber to provide a controlled combustion of the liquid propellants within the combustion chamber. The resulting combustion gases are directed out of the ports in the housing into the air bag or air bags connected thereto for inflating of the air bag.

The inflator also utilizes an improved liquid propellant having 56% by weight hydroxyl ammonium nitrate as an oxidizer, 19% triethyl ammonium nitrate as fuel and at least 20% water as a diluent to provide stability of the propellant.

These and other objects and advantages of the invention will become more apparent from the following detailed description taken in conjunction with the accompanying drawings wherein.

Figure 1:
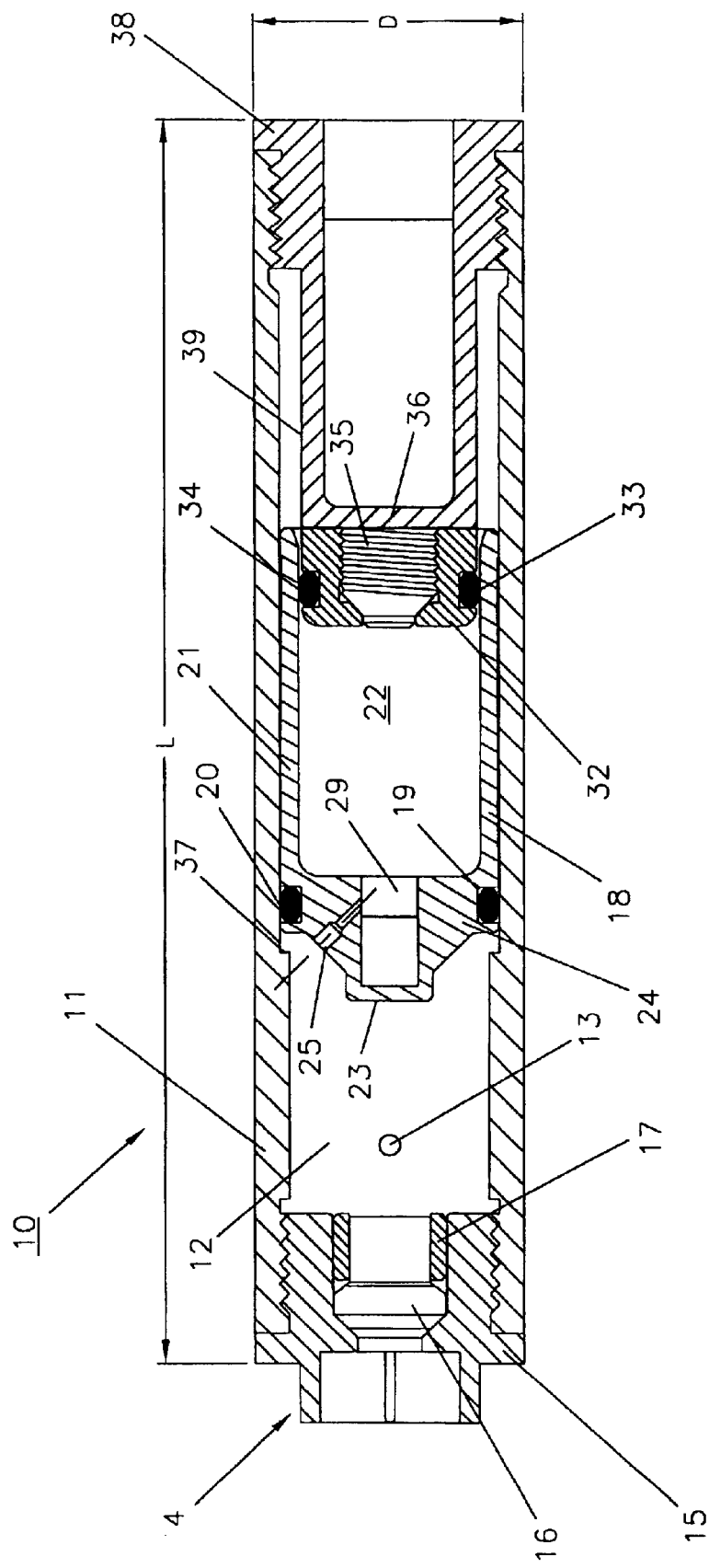
FIG. 1 illustrates a cross-sectional view of an air bag inflator constructed in accordance with the invention.

Referring to FIG. 1, the air bag inflator 10 includes a housing 11 in a form of a cylindrical tube that defines a combustion chamber 12 and that has at least one exhaust port 13 for expelling gas from the combustion chamber 12.

In addition, the inflator 10 has an initiator assembly 14 threadably mounted in one end of the housing 11 for introducing a combustion gas into the combustion chamber 12 The initiator assembly 14 is of conventional structure and includes a threaded plug 15 that threads into the housing 11, an initiator of conventional structure 16 within the plug 15 and an annular retainer 17 that retains the initiator 16 in place.

Upon actuation, the initiator 16 delivers a stream of hot combustion gases into the combustion chamber 12.

The inflator 10 also has an injection piston assembly including an injection piston 18 slidably mounted in the combustion chamber of the housing 11 for movement between an initial position, as shown, and a second retracted position, (not shown) in response to the introduction of a combustion gas from the initiator 16 into the combustion chamber 12. Typically, the injection piston 18 is of cylindrical cross section to fit within a cylindrical cross section of the housing 11. In addition, an annular groove 19 is provided in the injection piston 18 to receive a seal ring 20, such as an O-ring, in order to seal the space between the injection piston 18 and the housing 11 against a flow of combustion gas from the combustion chamber 11.

The injection piston 18 has a circumferential skirt 21 that defines a propellant chamber 22 for containing a charge of liquid propellant.

In addition, the injection piston 18 has a reduced nose 23 projecting into the combustion chamber 11 The nose 23 includes a conically shaped section 24 that extends towards the skirt 21.

Figure 2:
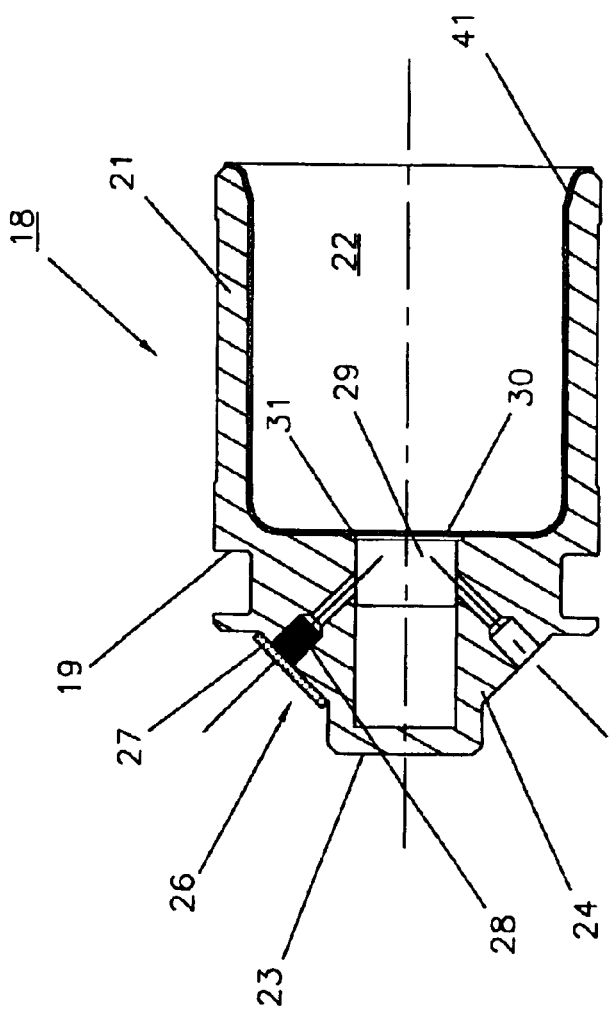
FIG. 2 illustrates a cross-sectional view of an injection piston employed in the inflator of FIG. 1.
Figure 3:
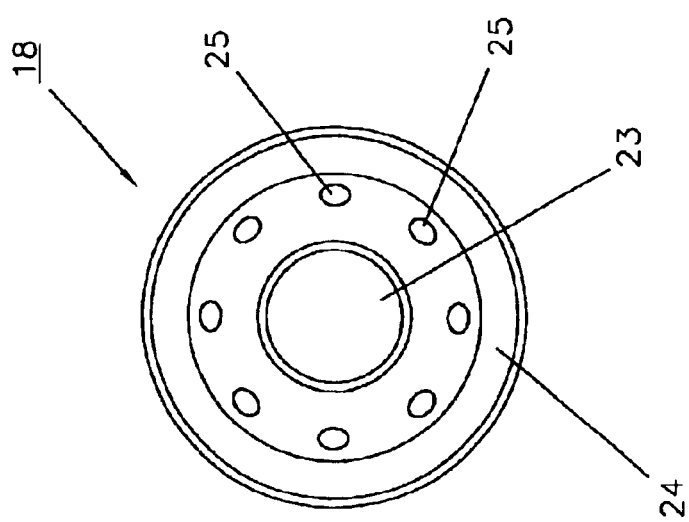
FIG. 3 illustrates an end view of the injection piston of FIG. 2.

Referring to FIGS. 2 and 3, the injection piston 18 has a plurality of nozzles 25 within the conically shaped section 24 that communicate the propellant chamber 22 with the combustion chamber in order to deliver liquid propellant thereto. A means 26 (see FIG. 2) is also provided for releasably closing each nozzle 25 in order to prevent communication between the propellant chamber 22 and the combustion chamber. As illustrated, this means 26 includes a tape 27 secured to the injection piston 18 over the nozzle 25 on a side facing the combustion chamber to prevent a flow of combustion gas from the combustion chamber into the nozzle 25 during startup. In addition, this means 26 includes a plug 28 fitted into a check valve section of the nozzle 25. This plug 28 is expellable from the nozzle 25 into the combustion chamber in response to a pressurized flow of liquid propellant from the propellant chamber as described below.

As illustrated in FIG. 3, the nozzles 25 are disposed in an equi-spaced manner about the circumference of the conically shaped section 24 of the injection piston 18. In this embodiment, a conically shaped tape 27 is secured to the conical section 24 of the injection piston over the nozzles 25.

The tape 27 that is used is a thin metal tape and is preferably made of aluminum or stainless steel. The plug 28 that is fitted into each nozzle is typically made of plastic, such as a Nylon. The Nylon plug 28 and thin metal tape 27 act as a check valve to protect the propellant in the propellant chamber 22 against flash back during startup. When a steady pressure differential between the propellant chamber and the combustion chamber is established, the tape 27 is burned and is otherwise consumed, at the same time, the plastic plug 28 is blown into the combustion chamber and the process of injecting the liquid propellant into the combustion chamber is established.

Each nozzle 25 is constructed with a diameter and length selected to reduce viscous losses and prevent flash back. The nozzle diameter to achieve proper droplet distribution and size is 0.5 to 1.2 millimeters and preferably 0.85 millimeters. The length to diameter ratio to prevent flash back is between 2.0 to 4–5 and preferably 3.8. The nozzle design is such as to reduce the sensitivity of the combustion process to changes in ambient temperature.

The nozzles 25 thus provide a relatively simple structure for controlling the flow of liquid propellant out of the propellant reservoir 22 into the combustion chamber 12.

Referring to FIGS. 1 and 2, an injection plug 29 is slidably mounted in the nose 23 of the injection piston 18 to move from a first position, as shown, blocking communication between the propellant chamber 23 and the nozzle 25 to a second position, not shown, to permit communication between the propellant chamber 22 and the nozzle 25 in response to a pressurized flow of liquid propellant from the propellant chamber 22. As indicated in FIG. 2, the injection plug 29 has a shoulder 30 facing the propellant chamber 22 that rests within a recess 31 of the injection piston 18. When the pressure of the liquid propellant reaches a certain level within the propellant chamber 22, the shoulder 30 is sheared off thereby allowing the remainder of the plug to move forwardly in order to expose the nozzles 25. At this time, the injection of the propellant into the combustion chamber 12 begins. The plug 29 also protects the propellant in the propellant chamber 22 against contact with the hot gas from the combustion chamber 12 until flow of propellant is established.

Alternatively, the injection plug 29 may be of cylindrical shape and held in place by a friction force between the plug 29 and the bore of the nose 23 of the injection piston 18. When the pressure in the propellant chamber 22 exceeds the prescribed value, the force acting on the plug 29 overcomes the friction force to push the plug 29 forwardly.

As an alternative to using a plug within the nozzle, a rupturable disc (not shown) may be welded or otherwise fixed within the recess 31. When the pressure in the propellant chamber 22 exceeds the prescribed value, the disc would rupture thereby opening the nozzle to start the injection of the propellant into the combustion chamber.

Referring to FIG. 1, a pump piston 32 is slidably mounted within the skirt 21 of the injection piston 18 in order to close off the propellant chamber 22 to complete the injection piston assembly. As indicated, the pump piston 32 is provided with an annular groove 33 to receive a seal ring 34, such as an O-ring, to seal the space between the pump piston 32 and the annular skirt 21 of the injection piston 18. In addition, the pump piston 32 has an internally threaded bore 35 into which a threaded plug 36 is mounted. The threaded bore 35 provides for access into the propellant chamber 22 in order to fill the chamber with a suitable liquid propellant. The plug 36 serves to close off the bore 35 after filling of the reservoir chamber.

The housing 11 has an internal shoulder 37 spaced from the piston assembly to limit movement of the injection piston 18 forwardly from the illustrated position due to thermal expansion of a liquid propellant and prevents separation of the injection piston 18 from the pump piston 32.

As illustrated, a plug 38 is threadably mounted into the end of the housing 11 opposite from the initiator 16 to close off the housing 11. In addition, this plug 38 is abutted against the pump piston 32 and has an outer cylindrical surface 39 to slidably receive the annular skirt 21 of the injection piston 18. The housing 11 also has at least one vent opening 40 to communicate with the space between the skirt 21 of the injection piston 18 and the plug 38 to release air trapped therebetween.

The inflator 10 is connected to a central processing unit (CPU) (not shown) so that the initiator 16 is able to receive a signal for initiation of the operation of the inflator 10. The CPU is, in turn, connected to one or more sensors within the vehicle in order to receive signals therefrom indicative of various circumstances. Based upon the received signals, the CPU operates in a conventional manner in order to actuate the initiator 16 of the inflator 10 to begin inflation of an airbag or airbags (not shown).

In operation, when a signal is received from a suitable sensor or source, the initiator 16 is activated to introduce hot combustion gases into the combustion chamber 12. As the gases fill and pressurize the combustion chamber 12, the injection piston 18 is pushed to the right, as viewed, so that the annular skirt 21 of the injection piston 18 slides over the cylindrical surface 39 of the plug 38. This, in turn, allows the pump piston 32 to pressurize the liquid propellant within the propellant chamber 22.

When the pressure of the liquid propellant exceeds a prescribed value, the injection plug 29 is pushed to the left, as viewed, thereby exposing the nozzles 25 to the pressurized propellant. Next, the liquid propellant traverses each nozzle 25 of the injection piston 18 thereby expelling the plug 28 (see FIG. 2) in each nozzle through the tape 27 over the outlet end of the nozzle 25 and into the combustion chamber 12. The liquid propellant is then ignited by the hot gases in the combustion chamber 12 so that there is a further buildup of pressure within the combustion chamber 12. This, in turn, causes the injection piston 18 to move further to the right over the plug 38 thereby expelling further liquid propellant into the combustion chamber 12. As the combustion gases fill the combustion chamber 12, the gases begin to pass through the exhaust port 13 to an air bag in a conventional manner. The exhaust port 13 is typically initially closed by means of a stainless steel tape (not shown) of prescribed thickness that opens gradually to prevent the extinguishment of the combustion process.

Typically, the pressure at which the nozzles 25 of the injection piston 18 are to be opened is between 10 and 20 MPa.

The housing 11 may be provided with a plurality of exhaust ports 13 each of which is in communication with a single air bag or a plurality of exhaust ports may be in communication with a single air bag.

A gradual opening of the exhaust ports 13 prevents extinguishment of the combustion during start up and controls the mass flow rate of the gas entering the air bag. Gradual opening of the exhaust ports 13 may be achieved by the use of rupture tapes of various thicknesses that rupture sequentially at various pressures.

Alternatively, use may be made of the movement of the piston to control the opening of the exhaust ports. The exhaust ports 13 in the housing 11 may also be staggered along the length of the housing 11 and along the length of the injection piston 18 so that as the piston 18 moves to the right, as indicated in FIG. 1, the ports 13 are sequentially exposed to allow a controlled out flow of the combustion gases.

Referring to FIG. 2, where the injection piston 18 is made of metal, a coating 41 is provided on the interior of the injection piston 18 about the propellant chamber 22 in order to prevent contact between the liquid propellant and the chamber 22 and the metal of the metal piston. Long term storage of the propellant can thus be achieved. Typically, the coating is made of a polytetrafluoroethylene (Teflon) Alternatively, the injection piston may be made of a material that is compatible with the propellant, such as a plastic. The protective coating may be PFA, HALAR, PVDF and the like.

The propellant is preferably a hydroxyl ammonium nitrate based liquid mono-propellant diluted (increased amount of water content) to reduce combustion temperature and increase long term thermal stability. The proposed composition has 56% by weight hydroxyl ammonium nitrate as an oxidizer, 19% by weight triethyl ammonium nitrate as fuel and at least 20% by weight water as a diluent to provide stability of the propellant. Additional stability of the propellant is achieved by the addition of a stabilized package, for example, consisting of etidronic acid, phosphonic acid and tetrasodium bisphosphonate.

Referring to FIG. 1, the air bag inflator 16 can be assembled in a relatively simple manner. For example, the plug 15 for holding the initiator 16 may be threaded into the end of the tube of the housing 11 and the initiator 16 then put into place and secured by means of the annular retainer 17.

Next, the injection piston assembly comprised of the injection piston 18 and pump piston 32 is slid into the barrel of the housing 11 in a slide fit manner. In this respect, the injection piston assembly may have been prefilled with liquid propellant within the propellant chamber 22 so that the plug 36 is threaded in place.

Thereafter, the elongated plug 38 is threaded into the end of the barrel of the housing 11 in order to abut the pump piston 32 and thereby hold the injection piston 18 in place.

Typically, the injection piston 18 is slid into the barrel of the housing under a friction force so that the friction force is sufficient to hold the injection piston in place.

Once assembled, the inflator 10 can be readily handled, transported and stored. By way of example, the overall length L of the inflator may be 125 millimeters with a diameter D of 27 millimeters.

The invention thus provides an air bag inflator which is not sensitive to changes of ambient temperature. In this respect, the liquid propellant is metered through the nozzles 25 of the injection piston 18 in dependence upon the differential pressure between the combustion chamber 12 and the propellant chamber 22. The combustion process is controlled by the flow of liquid propellant through the nozzles 25 only and not by the combustion kinetics of the liquid propellant.

Note is made that the injection piston 18 and pump piston 32 are sized relative to each other so that the pressure in the propellant chamber 22 is greater than the pressure in the combustion chamber 12 during movement of the injection piston 18 over the pump piston 32.

Further, the invention provides an air bag inflator which offers flashback protection during startup and which further prevents extinguishment of the combustion process during startup while controlling the mass flow rate of the gas entering an air bag.

What is claimed is:

1. An air bag inflator comprising a housing having a combustion chamber therein and at least one port for expelling combustion gas from said combustion chamber;

an initiator mounted on said housing for introducing a combustion gas into said combustion chamber;

an injection piston slidably mounted in said combustion chamber of said housing for movement between an initial position and a second position in response to the introduction of a combustion gas into said combustion chamber from said initiator, said piston including a circumferential skirt defining a propellant chamber therein for containing a charge of liquid propellant therein, at least one nozzle communicating said propellant chamber with said combustion chamber to deliver liquid propellant thereto, and means for releasably closing said nozzle to prevent communication between said propellant chamber and said combustion chamber;
a plug mounted in said housing coaxially of said piston to slidably receive said skirt of said piston; and
a pump piston mounted in abutment with one end of said plug and slidably receiving said skirt of said injection piston thereon.

2. An air bag inflator as set forth in claim 1 wherein said means includes a tape secured to said injection piston over said nozzle on a side facing said combustion chamber to prevent a flow of combustion gas from said combustion chamber through said nozzle during startup.

3. An air bag inflator as set forth in claim 2 wherein said tape is a metal tape.

4. An air bag inflator as set forth in claim 3 wherein said tape is made of aluminum.

5. An air bag inflator as set forth in claim 1 wherein said injection piston has a nose projecting into said combustion chamber and having a conically shaped section extending towards said initiator and wherein said nozzle has an outlet located in said conically shaped section.

6. An air bag inflator as set forth in claim 5 wherein injection piston has a plurality of said nozzles in said conically shaped section and said means includes a conically shaped tape secured to said conically shaped section over said nozzles.

7. An air bag inflator as set forth in claim 5 which further comprises an injection plug slidably mounted in said nose to move from a first position blocking communication between said propellant chamber and said nozzle to a second position to permit communication between said propellant chamber and said nozzle in response to a pressurized flow of liquid propellant from said propellant chamber.

8. An air bag inflator comprising
a housing having a combustion chamber therein and at least one part for expelling combustion gas from said combustion chamber;
an initiator mounted on said housing for introducing a combustion gas into said combustion chamber;
an injection piston slidably mounted in said combustion chamber of said housing for movement between an initial position and a second position in response to the introduction of a combustion gas into said combustion chamber from said initiator, said piston including a propellant chamber therein for containing a charge of liquid propellant therein, at least one nozzle communicating said propellant chamber with said combustion chamber to deliver liquid propellant thereto, and a plug fitted into said nozzle for releasably closing said nozzle to prevent communication between said propellant chamber and said combustion chamber, said plug being expellable from said nozzle into said combustion chamber in response to a pressurized flow of liquid propellant from said propellant chamber; and
a plug mounted in said housing coaxially of said piston to slidably receive said piston.

9. An air bag inflator as set forth in claim 8 wherein said plug is made of Nylon.

10. An air bag inflator comprising
a housing having a combustion chamber therein and at least one port for expelling combustion gas from said combustion chamber;
an initiator mounted on said housing for introducing a combustion gas into said combustion chamber;
a metal injection piston slidably mounted in said combustion chamber of said housing for movement between an initial position and a second position in response to the introduction of a combustion gas into said combustion chamber from said initiator, said piston including a propellant chamber therein for containing a charge of liquid propellant therein, a coating on said injection piston within said propellant chamber to prevent contact between a liquid propellant in said propellant chamber and said metal piston, at least one nozzle communicating said propellant chamber with said combustion chamber to deliver liquid propellant thereto, and means for releasably closing said nozzle to prevent communication between said propellant chamber and said combustion chamber; and
a plug mounted in said housing coaxially of said piston to slidably receive said piston.

11. An air bag inflator as set forth in claim 10 wherein said coating is made of a polytetrafluoroethylene plastic.

12. An air bag inflator comprising
a cylindrical housing having a combustion chamber therein and at least one exhaust port for expelling combustion gas from said combustion chamber;
an initiator mounted on one end of said housing for introducing a combustion gas into said combustion chamber;
an injection piston slidably mounted in said combustion chamber of said housing for movement between an initial position and a second position in response to the introduction of a combustion gas into said combustion chamber from said initiator, said piston including a propellant chamber therein for containing a charge of liquid propellant therein, at least one nozzle communicating said propellant chamber with said combustion chamber to deliver liquid propellant thereto, and means for releasably closing said nozzle to prevent communication between said propellant chamber and said combustion chamber; and
a plug threadably mounted in an opposite end of said housing from said initiator and coaxially of said piston to slidably receive said piston.

13. An air bag inflator as set forth in claim 12 wherein said means includes a tape secured to said injection piston over said nozzle on a side facing said combustion chamber to prevent a flow of combustion gas from said combustion chamber through said nozzle during startup.

14. An air bag inflator as set forth in claim 13 wherein said means further includes a plug fitted into said nozzle, said plug being expellable from said nozzle into said combustion chamber in response to a pressurized flow of liquid propellant from said propellant chamber.

15. An air bag inflator as set forth in claim 12 wherein said injection piston is made of metal and which further comprises a coating on said injection piston within said propellant chamber to prevent contact between a liquid propellant in said propellant chamber and said metal piston.

16. An air bag inflator as set forth in claim 12 wherein said injection piston has a nose projecting into said combustion chamber and having a conically shaped section extending towards said skirt and wherein said nozzle has an outlet located in said conically shaped section.

17. An air bag inflator as set forth in claim 16 wherein injection piston has a plurality of said nozzles in said conically shaped section and said means includes a conically shaped tape secured to said conically shaped section over said nozzles.

18. An air bag inflator as set forth in claim 16 which further comprises an injection plug slidably mounted in said nose to move from a first position blocking communication between said propellant chamber and said nozzle to a second position to permit communication between said propellant chamber and said nozzle in response to a pressurized flow of liquid propellant from said propellant chamber.

19. An air bag inflator as set forth in claim 12 further comprising a second piston mounted in abutment with one end of said plug and slidably receiving said injection piston thereon to pressurize liquid propellant in said propellant chamber in response to sliding of said injection piston onto said second piston.

20. An air bag inflator as set forth in claim 19 wherein said second piston is made of plastic.

21. An injection piston assembly for an inflator comprising a piston having a propellant chamber therein for containing a charge of liquid propellant therein, at least one nozzle in one end of said piston for communicating said propellant chamber with a combustion chamber external to the piston to deliver liquid propellant from said propellant chamber thereto, a plug fitted into said nozzle, said plug being expellable from said nozzle in response to a pressurized flow of liquid propellant from said propellant chamber, means for releasably closing said nozzle to prevent communication between said propellant chamber and the combustion chamber, and a pump piston slidably mounted in an opposite end of said injection piston to pressurize liquid propellant in said propellant chamber in response to sliding of said injection piston relative to said pump piston.

22. An injection piston as set forth in claim 21 wherein said means includes a tape secured to said injection piston over said nozzle on a side facing the combustion chamber to prevent a flow of combustion gas from the combustion chamber through said nozzle during startup.

23. An injection piston as set forth in claim 22 wherein said tape is a metal tape.

24. An injection piston as set forth in claim 23 wherein said tape is made of aluminum.

25. An injection piston as set forth in claim 21 wherein said plug is made of Nylon.

26. An injection piston as set forth in claim 21 wherein said injection piston is made of metal and which further comprises a coating on said injection piston within said propellant chamber to prevent contact between a liquid propellant in said propellant chamber and said metal piston.

27. An injection piston as set forth in claim 26 wherein said coating is made of a polytetrafluoroethylene plastic.

* * * * *